(12) United States Patent
Charytan et al.

(10) Patent No.: US 7,400,715 B2
(45) Date of Patent: Jul. 15, 2008

(54) PREPAID TELEPHONE CALLING CARD WITH DISTINCT PIN NUMBERS

(75) Inventors: Ariel Charytan, New York, NY (US); Elie Seidman, New York, NY (US)

(73) Assignee: Epana Networks, Inc., New York, NY (US)

(*) Notice: Subject to any disclaimer, the term of this patent is extended or adjusted under 35 U.S.C. 154(b) by 747 days.

(21) Appl. No.: 10/711,772

(22) Filed: Oct. 4, 2004

(65) Prior Publication Data

US 2005/0259799 A1 Nov. 24, 2005

Related U.S. Application Data

(60) Provisional application No. 60/521,553, filed on May 21, 2004.

(51) Int. Cl.
*H04M 15/00* (2006.01)

(52) U.S. Cl. .............................. 379/114.15; 379/114.2; 379/144.01; 235/74; 235/380; 428/42.3; 428/43; 40/674

(58) Field of Classification Search ................ 379/111, 379/114.01, 114.15, 114.17, 114.2, 91.01, 379/93.02–4; 235/380, 487, 490–492
See application file for complete search history.

(56) References Cited

U.S. PATENT DOCUMENTS

| 7,290,703 B2* | 11/2007 | Jacobs ..................... 235/380 |
| 2002/0088851 A1* | 7/2002 | Hodes ..................... 235/380 |
| 2004/0120475 A1* | 6/2004 | Bauer et al. ............. 379/88.18 |
| 2004/0139318 A1* | 7/2004 | Fiala et al. .................. 713/165 |
| 2005/0008132 A1* | 1/2005 | Paschini et al. .......... 379/93.12 |
| 2005/0116028 A1* | 6/2005 | Cohen et al. ............... 235/380 |
| 2005/0123112 A1* | 6/2005 | New et al. ................. 379/114.2 |

* cited by examiner

*Primary Examiner*—Binh K Tieu
(74) *Attorney, Agent, or Firm*—Oppedahl Patent Law Firm LLC

(57) ABSTRACT

A prepaid long-distance telephone calling card has two or more distinct PIN numbers each obscured by opaque scratch-off material. Each PIN number is associated with prepaid value. A user can scratch off the opaque material for PIN numbers one by one, and the value for each PIN number expires in a way that is unrelated to any other PIN number on the card.

27 Claims, 2 Drawing Sheets

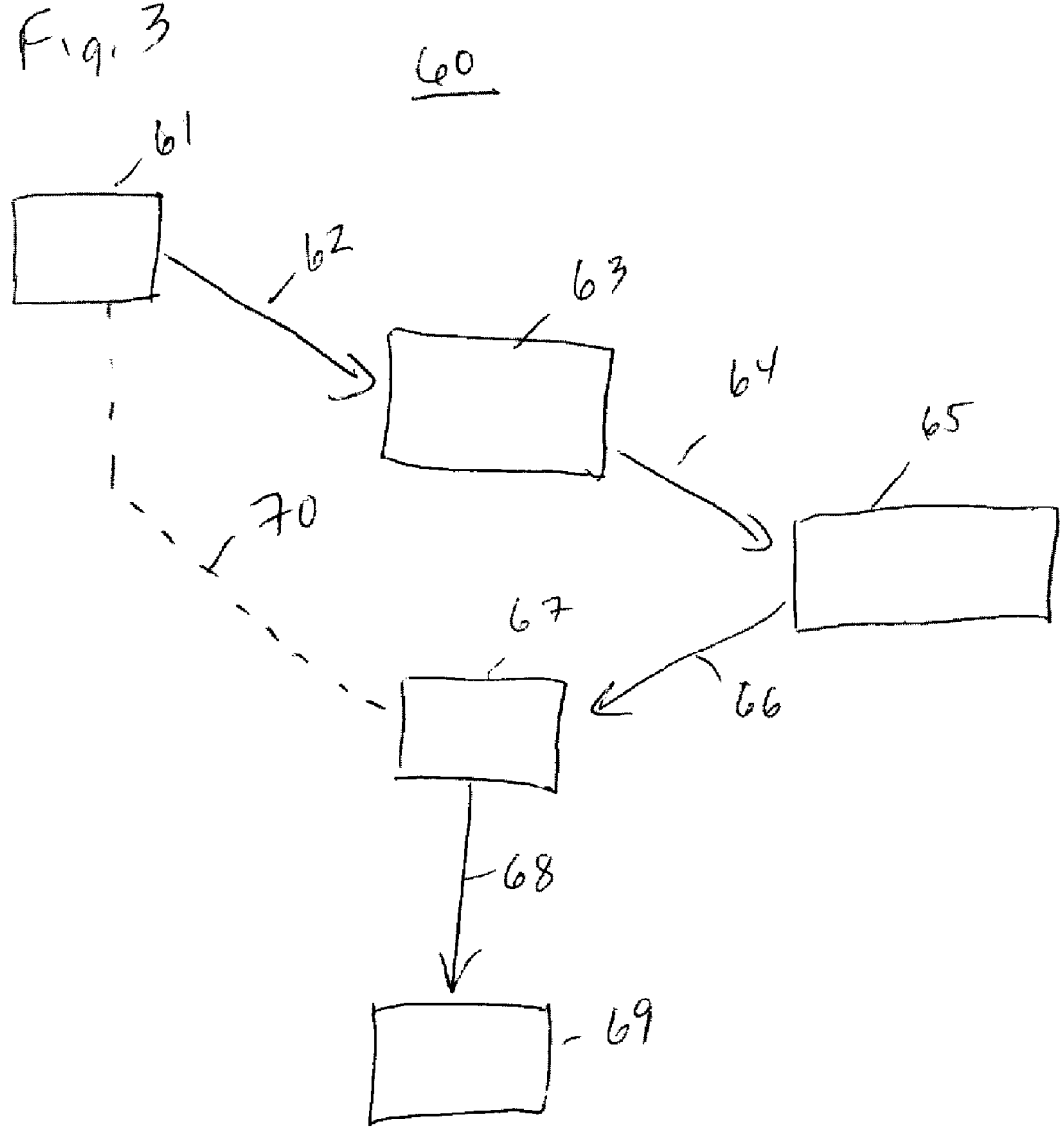

PREPAID TELEPHONE CALLING CARD WITH DISTINCT PIN NUMBERS

CROSS-REFERENCE TO RELATED APPLICATIONS

This application claims priority from U.S. application No. 60/521,553 filed May 21, 2004, which application is incorporated herein by reference for all purposes.

BACKGROUND OF THE INVENTION

Prepaid long-distance telephone calling cards are very popular, but they have drawbacks. The prepaid card will typically have a face value for the total value of calls that may be dialed. In addition, the card will typically have an expiration date that is determined based upon the date the card is first used, for example based upon a standard usage interval such as a three-month period. The would-be purchaser of a prepaid calling card faces the problem of trying to guess how many calls he or she will make during the usage interval. If the would-be purchaser selects a calling card with a high value, there is the risk that the usage interval will have ended before the entire value gets used. This loses money from the point of view of the purchaser. On the other hand, if the would-be purchaser selects a calling card with a low value, the purchaser may use up the value long before the usage interval has expired, thus facing the prospect of having to incur the time and inconvenience of making another purchase of a calling card right away.

A user of a purchased calling card may wish to give a card to someone else after it has been partially used. The recipient may prefer, however, to know how much stored value remains, simply by looking at the card. Prior-art cards do not offer such a capability.

These problems have existed for a very long time and have not, until now, been successfully addressed. It is clear that there is a great need for an approach that permits a user to purchase a large-value calling card without having to worry about losing some of the value of the card due to expiration of a usage interval.

One approach to these problems is to make and sell small-value calling cards. Instead of buying, say, a ten-dollar card, a purchaser could purchase five two-dollar cards. This is a nuisance for the seller, who must stock and count and inventory perhaps five times as many cards if this approach is followed. It is also a nuisance for the buyer who must carry around five cards. Such a buyer may be annoyed to have some unexpired value associated with a first card (out of a group of, say, five cards) that cannot be used in conjunction with a second card.

SUMMARY OF THE INVENTION

A prepaid long-distance telephone calling card has two or more distinct PIN numbers each obscured by opaque scratch-off material. Each PIN number is associated with prepaid value. A user can scratch off the opaque material for PIN numbers one by one, and the value for each PIN number expires in a way that is unrelated to any other PIN number on the card.

DETAILED DESCRIPTION

Figure 1:
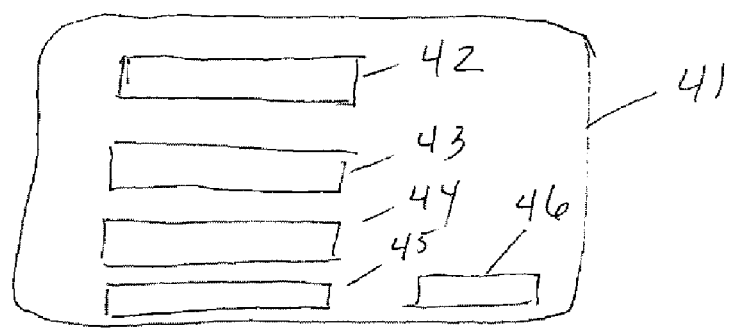
FIG. 1 shows a prepaid calling card according to the invention.

FIG. 1 shows a prepaid calling card 41 according to the invention. The card 41 bears an access telephone number 42, preferably a toll-free telephone number. The card 41 also bears a PIN number 43 which is obscured by an opaque scratch-off material (omitted for clarity in FIG. 1). In an exemplary embodiment there is also a serial number 46 on the card 41.

A user can scratch off the opaque material, revealing the PIN number 43. After doing this, the user can dial the access number 42, following voice prompts to enter the PIN number 43 and a desired telephone number to call.

A service provider (omitted for clarity in FIG. 1) receives the call to the access number and checks the PIN number 43 in a database. If the PIN number 43 has not expired, and if there is unused stored value associated with the PIN number 43, then the service provider completes the call to the desired telephone number.

The service provider keeps track of the duration and cost of the call and updates its database accordingly. Eventually the PIN number 43 will cease to be usable for placing telephone calls, either because the prepaid value has been used up, or because the PIN number 43 has expired.

In a typical arrangement, the first use of the PIN number 43 will start a pre-determined usage interval. Once the usage interval has passed, the database record for the PIN number 43 will be deleted or marked to show the expiration. Any further attempt to use the PIN number 43 will be unsuccessful.

The sequence of events just described in connection with FIG. 1 is a sequence of events that is well known and is commonplace with stored-value prepaid long-distance calling cards in the prior art. Importantly, however, the card according to the invention differs from such prior-art cards in that it has one or more additional PIN numbers 44, 45, each likewise obscured by an opaque scratch-off material (also omitted for clarity in FIG. 1). Each PIN number 43, 44, 45 has its own stored-value amount and its own usage interval.

Thus, one way to use the card 41 is to scratch off the first scratch-off area to reveal the first PIN number 43. The user can then place telephone calls using the first PIN number 43. Once that PIN number 43 has been "used up" the user can scratch off the second scratch-off area to reveal the second PIN number 44. The user can then place telephone calls using the second PIN number 44. Once that PIN number 44 has been "used up" the user can scratch off the third scratch-off area to reveal the third PIN number 45. The user can then place telephone calls using the third PIN number 45.

Some of the advantages of this approach may now be appreciated. A would-be purchaser who is considering purchasing a prior-art ten-dollar calling card, or who is considering purchasing five two-dollar calling cards, may well prefer instead to purchase a single ten-dollar calling card that has five PIN numbers as described herein. Such a card does not risk losing all of its value simply because the (first) PIN number has been used at least once and has expired.

If the first PIN number does become unusable due to expiration of the usage interval, the user of such a card loses, at most, the value associated with the first PIN number. Meanwhile the remaining PIN numbers have not lost any value.

Importantly, the shopkeeper selling such cards need not stock large numbers of small-value cards, but can instead stock large-value cards having multiple PIN numbers each. This saves the shopkeeper from having to count and inventory large numbers of small cards.

Optionally the user could be saved from loss of partial value of a first PIN number, by having the system "roll over" any unused and unexpired value associated with the first PIN number into the second PIN number.

It will be appreciated that the teachings of the invention offer their benefits in several settings. For example, one type of calling card has stored value as it sits in a shop waiting to be purchased. With such a "stored-value" card, shoplifting is a potential problem as the possessor of the card can use it to place calls armed with nothing more than the access number and PIN number on the card.

A second type of calling card is without value as it sits in a shop waiting to be purchased. At the time of purchase, the card is "swiped" through a card reader and the card is "activated." With such a system, the service provider receives the swiped data and loads the associated PIN number into the service provider's database. Such a card has the advantage that the shopkeeper need not worry about shoplifting of such a card. It has a potential disadvantage in that the shopkeeper is thus required to have a card reader with an appropriate data connection to the service provider.

Some shopkeepers lack the card reader and data line that would be needed to support a "swipe" card. Such shopkeepers prefer a card that works without any need for "swiping."

In a simple case one might assume that a user would use the entire value of the card, scratching off one of the PINs and then another until all of them have been used. Another possibility is that a purchaser would use one of the PINs and then give or sell the card to someone else who could use another of the PINs.

Figure 2:
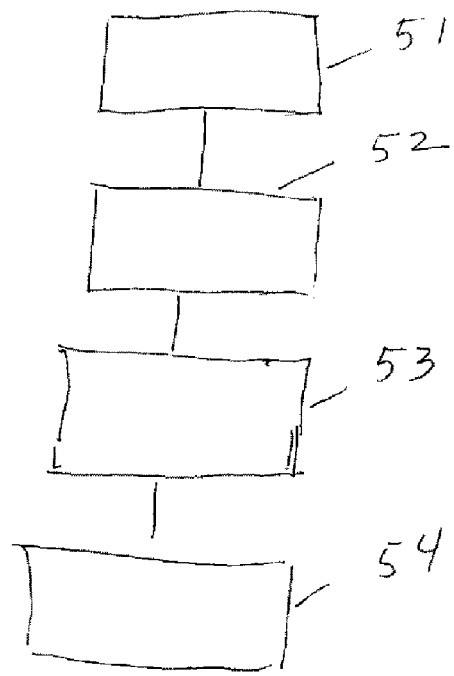
FIG. 2 is a flow chart showing method steps in accordance with the invention.
Figure 1:
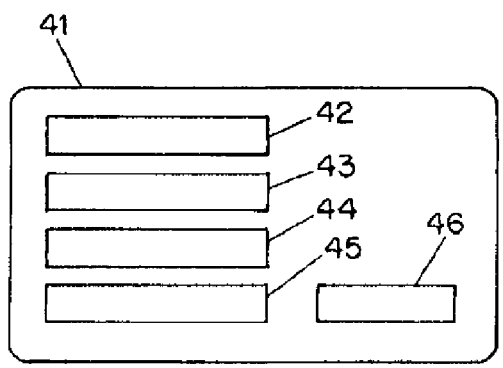
Figure 2:
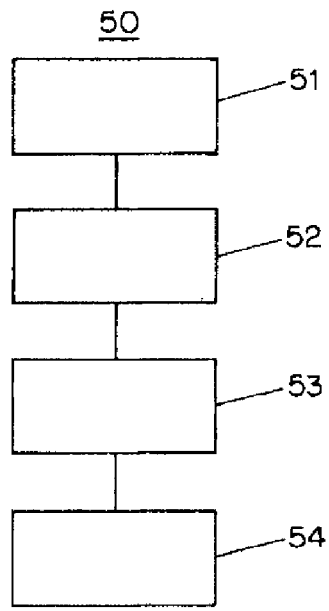

FIG. 2 is a flow chart 50 showing method steps in accordance with the invention.

In FIG. 2 we see an optional first step 51 which is the "swiping" that might be done at a point of sale. This step is not needed if the card is a stored-value card.

Next we see step 52, in which a user makes use of the first PIN number. Later we see step 53, in which a user makes use of the second PIN number. Still later we see step 54, in which a user makes use of the third PIN number.

Figure 3:
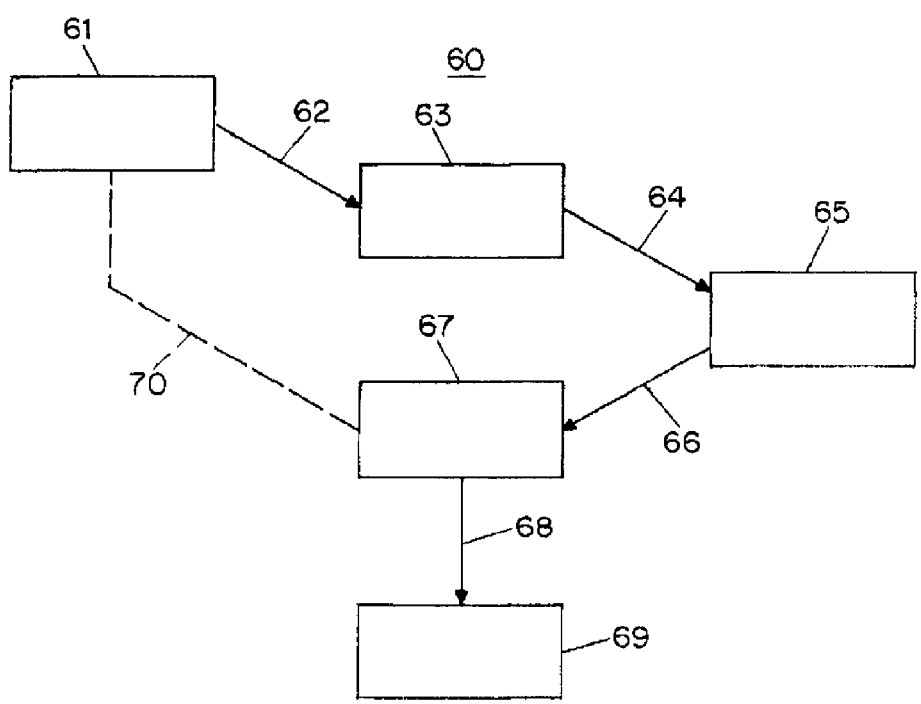
FIG. 3 shows one approach for creating and distributing PIN numbers.

FIG. 3 shows one approach 60 for creating and distributing PIN numbers. In this approach, the card maker 63 makes cards bearing access numbers and PIN numbers, which are distributed at 64 to end users 65. (In many cases there are intermediate distributors of the cards, omitted for clarity in FIG. 3.) An end user 65 receives a card, and scratches off the scratch-off material to reveal a PIN number. The end user 65 then places one or more telephone calls using the PIN number until the prepaid value is used up or until the PIN number expires. The calls are placed by calling 66 to a telephone and computer system 67 which then completes 68 the call to a destination 69.

Importantly, in this approach 60, the card maker 63 does not actually operate the telephone and computer system 67 but essentially resells service from a service provider 61. Service provider 61 controls 70 the telephone and computer system 67. Service provider 61 sells PIN numbers at 62 to the card maker 63, and the card maker 63 prints the PIN numbers on the cards. Card maker 63 pays money to service provider 61 which covers the PIN numbers themselves as well as the underlying long-distance telephone services at 66, 67, 68.

In such an approach 60 when carried out according to the invention, the PIN numbers are provided 62 in groups of, say, five at a time. Each group of PIN numbers which is intended to be printed on a single card will be associated with a toll-free access number and with a card serial number. All are printed on a card and the scratch-off material is applied to the PIN numbers.

Having provided a group of PIN numbers for a particular card, the service provider 61 keeps records of the PIN numbers and provides service to the user of the PIN numbers. Each PIN number has its own associated prepaid value, and in a typical arrangement each PIN number has its own expiration date based upon the date it was first used.

Optionally the service provider might choose to design the underlying computer systems to permit "carrying over" unused value from the first PIN to the second PIN and so on.

Those skilled in the art will have no difficulty devising myriad obvious variations and improvements upon the invention, all of which are intended to be embraced within the claims that follow.

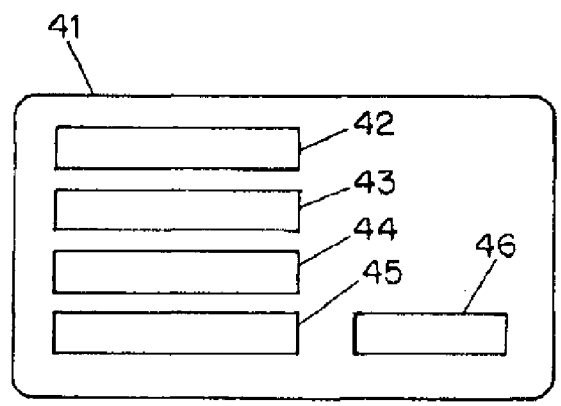

What is claimed is:

1. A method for use with a telephone calling card, the card bearing a telephone access number, the card bearing a first PIN number obscured by an opaque scratch-off material, the card bearing a second PIN number obscured by an opaque scratch-off material, the method comprising the steps of:

receiving a first telephone call from a first caller at the telephone access number;

via the first telephone call, receiving the first PIN number and connecting at least one long-distance telephone call for the first caller;

receiving a second telephone call from a second caller at the telephone access number;

via the second telephone call, receiving the second PIN number and connecting at least one long-distance telephone call for the second caller.

2. The method of claim 1 wherein the step of connecting at least one long-distance telephone call for the second caller after receiving the second PIN number takes place after the first PIN number ceases to be usable to make any long-distance telephone call.

3. The method of claim 1 wherein the card further bears a third PIN number obscured by an opaque scratch-off material, the method further comprising the steps of:

receiving a third telephone call from a third caller at the telephone access number;

via the third telephone call, receiving the third PIN number and connecting at least one long-distance telephone call for the third caller.

4. The method of claim 3 wherein the step of connecting at least one long-distance telephone call for the second caller after receiving the second PIN number takes place after the first PIN number ceases to be usable to make any long-distance telephone call, and wherein the step of connecting at least one long-distance telephone call for the third caller after receiving the third PIN number takes place after the second PIN number ceases to be usable to make any long-distance telephone call.

5. The method of claim 3 wherein the second caller and the third caller are the same person.

6. The method of claim 3 wherein the second caller and the third caller are different persons.

7. The method of claim 1 wherein the first caller and the second caller are the same person.

8. The method of claim 1 wherein the first caller and the second caller are different persons.

9. A method for use with a telephone calling card, the card bearing a telephone access number, the card bearing a first PIN number obscured by an opaque scratch-off material, the card bearing a second PIN number obscured by an opaque scratch-off material, the method comprising the steps of:
- scratching off the opaque scratch-off material obscuring the first PIN number;
- using the first PIN number with the telephone access number to make a first at least one long-distance telephone call;
- scratching off the opaque scratch-off material obscuring the second PIN number; and
- using the second PIN number with the telephone access number to make a second at least one long-distance telephone call.

10. The method of claim 9 wherein the step of scratching off the opaque scratch-off material obscuring the second PIN number takes place after the first PIN number ceases to be usable to make any long-distance telephone call.

11. The method of claim 9 wherein the card further bears a third PIN number obscured by an opaque scratch-off material, the method further comprising the steps of:
- scratching off the opaque scratch-off material obscuring the third PIN number; and
- using the third PIN number with the telephone access number to make a third at least one long-distance telephone call.

12. The method of claim 11 wherein the step of scratching off the opaque scratch-off material obscuring the second PIN number takes place after the first PIN number ceases to be usable to make any long-distance telephone call, and wherein the step of scratching off the opaque scratch-off material obscuring the third PIN number takes place after the second PIN number ceases to be usable to make any long-distance telephone call.

13. Apparatus comprising:
- a card;
- the card bearing a telephone access number;
- the card bearing a first PIN number obscured by an opaque scratch-off material;
- the card bearing a second PIN number obscured by an opaque scratch-off material;
- the card bearing a third PIN number obscured by an opaque scratch-off material;
- the card bearing a fourth PIN number obscured by an opaque scratch-off material;
- the card bearing a fifth PIN number obscured by a scratch-off material;
- each PIN number associated with a respective prepaid amount of long-distance telephone service.

14. A method for use with a telephone calling card, the card bearing a telephone access number, the card bearing a first PIN number, the card bearing a second PIN number, the method comprising the steps of:
- receiving a first telephone call from a first caller at the telephone access number;
- via the first telephone call, receiving the first PIN number and connecting at least one long-distance telephone call for the first caller;
- receiving a second telephone call from a second caller at the telephone access number;
- via the second telephone call, receiving the second PIN number and connecting at least one long-distance telephone call for the second caller.

15. The method of claim 14 wherein the step of connecting at least one long-distance telephone call for the second caller after receiving the second PIN number takes place after the first PIN number ceases to be usable to make any long-distance telephone call.

16. The method of claim 14 wherein the card further bears a third PIN number, the method further comprising the steps of:
- receiving a third telephone call from a third caller at the telephone access number;
- via the third telephone call, receiving the third PIN number and connecting at least one long-distance telephone call for the third caller.

17. The method of claim 16 wherein the step of connecting at least one long-distance telephone call for the second caller after receiving the second PIN number takes place after the first PIN number ceases to be usable to make any long-distance telephone call, and wherein the step of connecting at least one long-distance telephone call for the third caller after receiving the third PIN number takes place after the second PIN number ceases to be usable to make any long-distance telephone call.

18. The method of claim 16 wherein the second caller and the third caller are the same person.

19. The method of claim 16 wherein the second caller and the third caller are different persons.

20. The method of claim 14 wherein the first caller and the second caller are the same person.

21. The method of claim 14 wherein the first caller and the second caller are different persons.

22. A method for use with a telephone calling card, the card bearing a telephone access number, the card bearing a first PIN number, the card bearing a second PIN number, the method comprising the steps of:
- using the first PIN number with the telephone access number to make a first at least one long-distance telephone call;
- using the second PIN number with the telephone access number to make a second at least one long-distance telephone call.

23. The method of claim 22 wherein the step of using the second PIN number takes place after the first PIN number ceases to be usable to make any long-distance telephone call.

24. The method of claim 22 wherein the card further bears a third PIN number, the method further comprising the steps of:
- using the third PIN number with the telephone access number to make a third at least one long-distance telephone call.

25. The method of claim 24 wherein the step using the second PIN number takes place after the first PIN number ceases to be usable to make any long-distance telephone call, and wherein the step of using the third PIN number takes place after the second PIN number ceases to be usable to make any long-distance telephone call.

26. A method for use by a card maker, the method comprising the steps of:
- receiving from a long-distance telephone service provider groups of PIN numbers, each group to be associated with a respective calling card and each PIN number associated with a respective amount of prepaid long-distance telephone service;
- printing calling cards;
- for each calling card, printing on the calling card PIN numbers from a group;
- for each calling card, applying a an opaque scratch-off material to obscure the PIN numbers; and
- distributing the calling cards to users.

27. A method for use by a long-distance telephone service provider, the method comprising the steps of:
- providing to a card maker groups of PIN numbers, each group to be associated with a respective calling card and each PIN number associated with a respective amount of prepaid long-distance telephone service; and
- providing long-distance telephone service to users of the PIN numbers.

* * * * *

UNITED STATES PATENT AND TRADEMARK OFFICE
CERTIFICATE OF CORRECTION

| | | |
|---|---|---|
| PATENT NO. | : 7,400,715 B2 | |
| APPLICATION NO. | : 10/711772 | |
| DATED | : July 15, 2008 | |
| INVENTOR(S) | : Charytan et al. | |

It is certified that error appears in the above-identified patent and that said Letters Patent is hereby corrected as shown below:

The Title page, showing an illustrative figure, should be deleted and substitute therefor the attached title page.

DELETE DRAWING SHEETS 1 – 2 AND SUBSTITUTE THEREFOR THE DRAWING SHEET CONSISTING OF FIGS 1- 3 AS SHOWN ON THE ATTACHED PAGES.

Signed and Sealed this

Twenty-seventh Day of January, 2009

JOHN DOLL
*Acting Director of the United States Patent and Trademark Office*

(12) United States Patent
Charytan et al.

(10) Patent No.: US 7,400,715 B2
(45) Date of Patent: Jul. 15, 2008

(54) PREPAID TELEPHONE CALLING CARD WITH DISTINCT PIN NUMBERS

(75) Inventors: Ariel Charytan, New York, NY (US); Elie Seidman, New York, NY (US)

(73) Assignee: Epana Networks, Inc., New York, NY (US)

( * ) Notice: Subject to any disclaimer, the term of this patent is extended or adjusted under 35 U.S.C. 154(b) by 747 days.

(21) Appl. No.: 10/711,772

(22) Filed: Oct. 4, 2004

(65) Prior Publication Data

US 2005/0259799 A1 Nov. 24, 2005

Related U.S. Application Data

(60) Provisional application No. 60/521,553, filed on May 21, 2004.

(51) Int. Cl.
*H04M 15/00* (2006.01)
(52) U.S. Cl. .............. 379/114.15; 379/114.2; 379/144.01; 235/74; 235/380; 428/42.3; 428/43; 40/674

(58) Field of Classification Search .......... 379/111, 379/114.01, 114.15, 114.17, 114.2, 91.01, 379/93.02–4; 235/380, 487, 490–492
See application file for complete search history.

(56) References Cited

U.S. PATENT DOCUMENTS

| | | | | |
|---|---|---|---|---|
| 7,290,703 B2* | 11/2007 | Jacobs | ......... | 235/380 |
| 2002/0088851 A1* | 7/2002 | Hodes | ......... | 235/380 |
| 2004/0120475 A1* | 6/2004 | Bauer et al. | ......... | 379/88.18 |
| 2004/0139318 A1* | 7/2004 | Fiala et al. | ......... | 713/165 |
| 2005/0008132 A1* | 1/2005 | Paschini et al. | ......... | 379/93.12 |
| 2005/0116028 A1* | 6/2005 | Cohen et al. | ......... | 235/380 |
| 2005/0123112 A1* | 6/2005 | New et al. | ......... | 379/114.2 |

* cited by examiner

*Primary Examiner*—Binh K Tieu
(74) *Attorney, Agent, or Firm*—Oppedahl Patent Law Firm LLC

(57) ABSTRACT

A prepaid long-distance telephone calling card has two or more distinct PIN numbers each obscured by opaque scratch-off material. Each PIN number is associated with prepaid value. A user can scratch off the opaque material for PIN numbers one by one, and the value for each PIN number expires in a way that is unrelated to any other PIN number on the card.

27 Claims, 1 Drawing Sheet